(12) United States Patent
Kuhn et al.

(10) Patent No.: US 11,084,245 B2
(45) Date of Patent: Aug. 10, 2021

(54) CROSS-LAMINATED TIMBER HAVING A CONDUIT THEREIN

(71) Applicant: Six Minutes LLC, Spokane, WA (US)

(72) Inventors: Tyler Valentine Kuhn, Spokane, WA (US); Michael Ryan Bradley, Spokane, WA (US)

(*) Notice: Subject to any disclaimer, the term of this patent is extended or adjusted under 35 U.S.C. 154(b) by 0 days.

(21) Appl. No.: 16/243,711

(22) Filed: Jan. 9, 2019

(65) Prior Publication Data
US 2020/0215784 A1 Jul. 9, 2020

(51) Int. Cl.
*B32B 3/08* (2006.01)
*B32B 3/10* (2006.01)
(Continued)

(52) U.S. Cl.
CPC ............... *B32B 3/18* (2013.01); *B32B 3/14* (2013.01); *B32B 3/20* (2013.01); *B32B 3/266* (2013.01); *B32B 5/12* (2013.01); *B32B 7/12* (2013.01); *B32B 21/04* (2013.01); *B32B 21/042* (2013.01); *B32B 21/13* (2013.01); *B32B 21/14* (2013.01); *E04C 2/12* (2013.01); *E04C 2/24* (2013.01); *E04C 2/521* (2013.01); *E04C 2/525* (2013.01); *B27K 2200/30* (2013.01); *B27K 2240/20* (2013.01); *B27K 2240/30* (2013.01); *B27M 3/0026* (2013.01); *B27M 3/0086* (2013.01); *B32B 3/02* (2013.01); *B32B 3/08* (2013.01);
(Continued)

(58) Field of Classification Search
None
See application file for complete search history.

(56) References Cited

U.S. PATENT DOCUMENTS 823,843 A * 6/1906 Buyten ............... B27D 1/06
428/106
1,734,826 A * 11/1929 Israel ............... E04F 15/04
428/44
(Continued)

FOREIGN PATENT DOCUMENTS

BE 1024499 B1 3/2018
CA 2256257 A1 * 6/2000 ........... E04B 2/7457
(Continued)

OTHER PUBLICATIONS

Machine Translation of JP 61175412 U, Nov. 1986 (Year: 1986).*
(Continued)

*Primary Examiner* — Jeffrey A Vonch
(74) *Attorney, Agent, or Firm* — Mark Farrell; Farrell Patent Law PC

(57) ABSTRACT

A cross-laminated panel including a first layer, a second layer, and a third layer. The first layer of the cross-laminated panel having first boards oriented in a first direction. The second layer of the cross-laminated panel having second boards oriented in a second direction, the second direction being substantially perpendicular to the first direction. The third layer of the cross-laminated panel having third boards oriented in the first direction. The cross-laminated panel also including adhesive situated between each of the first layer, the second layer, and the third layer. The cross-laminated panel further including a hollow member forming a conduit and disposed in any one of the first layer, the second layer, and the third layer.

20 Claims, 5 Drawing Sheets

(51) Int. Cl.

| | | |
|---|---|---|
| *B32B 3/18* | (2006.01) | |
| *B32B 3/20* | (2006.01) | |
| *B32B 3/24* | (2006.01) | |
| *B32B 7/12* | (2006.01) | |
| *B32B 21/04* | (2006.01) | |
| *B32B 21/14* | (2006.01) | |
| *E04C 2/12* | (2006.01) | |
| *E04C 2/24* | (2006.01) | |
| *E04C 2/52* | (2006.01) | |
| *B32B 3/14* | (2006.01) | |
| *B32B 3/26* | (2006.01) | |
| *B32B 21/13* | (2006.01) | |
| *B32B 5/12* | (2006.01) | |
| *B32B 37/02* | (2006.01) | |
| *B32B 37/10* | (2006.01) | |
| *B32B 37/12* | (2006.01) | |
| *B32B 37/14* | (2006.01) | |
| *B32B 38/04* | (2006.01) | |
| *B27M 3/00* | (2006.01) | |
| *B32B 15/04* | (2006.01) | |
| *B32B 15/08* | (2006.01) | |
| *B32B 15/10* | (2006.01) | |
| *B32B 15/14* | (2006.01) | |
| *B32B 3/02* | (2006.01) | |
| *B32B 7/03* | (2019.01) | |
| *B32B 5/26* | (2006.01) | |

(52) U.S. Cl.
CPC .. *B32B 3/10* (2013.01); *B32B 5/26* (2013.01); *B32B 7/03* (2019.01); *B32B 15/043* (2013.01); *B32B 15/08* (2013.01); *B32B 15/10* (2013.01); *B32B 15/14* (2013.01); *B32B 37/02* (2013.01); *B32B 37/10* (2013.01); *B32B 37/12* (2013.01); *B32B 37/1207* (2013.01); *B32B 37/14* (2013.01); *B32B 37/142* (2013.01); *B32B 38/04* (2013.01); *B32B 2038/047* (2013.01); *B32B 2250/03* (2013.01); *B32B 2250/05* (2013.01); *B32B 2250/40* (2013.01); *B32B 2250/42* (2013.01); *B32B 2307/102* (2013.01); *B32B 2307/304* (2013.01); *B32B 2307/3065* (2013.01); *B32B 2307/50* (2013.01); *B32B 2307/764* (2013.01); *B32B 2317/16* (2013.01); *B32B 2398/00* (2013.01); *B32B 2419/00* (2013.01); *B32B 2419/06* (2013.01); *B32B 2607/00* (2013.01); *Y10T 428/24008* (2015.01); *Y10T 428/24058* (2015.01); *Y10T 428/24132* (2015.01); *Y10T 428/24182* (2015.01); *Y10T 428/24322* (2015.01); *Y10T 428/24331* (2015.01); *Y10T 428/24744* (2015.01); *Y10T 428/24777* (2015.01)

(56) References Cited

U.S. PATENT DOCUMENTS

| | | | | |
|---|---|---|---|---|
| 2,016,273 A * | 10/1935 | Atwood | B27D 1/06 | 428/106 |
| 2,369,006 A * | 2/1945 | Stone Banks | E04B 1/806 | 156/221 |
| 2,477,852 A * | 8/1949 | Bacon | E04C 2/36 | 428/116 |
| 2,479,870 A * | 8/1949 | Rundquist | E06B 3/7015 | 428/98 |
| 3,172,170 A * | 3/1965 | Webster | E04C 2/14 | 52/585.1 |
| 3,234,074 A * | 2/1966 | Bryant | E04C 2/12 | 428/54 |
| 3,677,868 A * | 7/1972 | Boggs | B32B 21/10 | 428/141 |
| 3,818,659 A * | 6/1974 | Anderson | E04B 5/48 | 52/220.5 |
| 4,093,762 A * | 6/1978 | Kiefer | B27D 1/04 | 144/346 |
| 4,568,577 A * | 2/1986 | Fischetti | B27M 3/006 | 428/33 |
| 4,810,551 A * | 3/1989 | Chu | B27J 1/003 | 428/106 |
| 5,109,898 A | 5/1992 | Schacht | | |
| 5,115,609 A * | 5/1992 | Sing | E04C 3/14 | 52/309.9 |
| 5,119,593 A * | 6/1992 | Bae | E06B 3/7005 | 49/501 |
| 5,618,371 A * | 4/1997 | Sing | B27B 1/00 | 144/345 |
| 5,725,929 A * | 3/1998 | Cooke | B27D 1/04 | 428/106 |
| 5,865,929 A * | 2/1999 | Sing | E04C 3/127 | 156/264 |
| 5,896,723 A * | 4/1999 | Sing | E04C 3/29 | 52/847 |
| 6,106,655 A * | 8/2000 | Moser | B32B 3/30 | 156/285 |
| 6,534,143 B1 * | 3/2003 | Thoma | B32B 7/08 | 428/44 |
| 2001/0034996 A1 * | 11/2001 | Mathis | E04C 3/14 | 52/847 |
| 2004/0101649 A1 * | 5/2004 | Thoma | E04C 2/12 | 428/54 |
| 2005/0045270 A1 * | 3/2005 | Brunet | B27M 3/006 | 156/254 |
| 2005/0266199 A1 * | 12/2005 | Hasch | B32B 15/10 | 428/54 |
| 2006/0123725 A1 * | 6/2006 | Godwin | B32B 21/14 | 52/309.11 |
| 2006/0265998 A1 * | 11/2006 | Barker | E04B 5/12 | 52/745.05 |
| 2007/0283661 A1 * | 12/2007 | Daniels | E04C 3/36 | 52/841 |
| 2009/0307996 A1 * | 12/2009 | Berger | B32B 3/26 | 52/144 |
| 2010/0151175 A1 * | 6/2010 | Gao | B27D 1/10 | 428/58 |
| 2011/0099935 A1 * | 5/2011 | Dorozhkin | B27M 3/0046 | 52/592.1 |
| 2013/0125507 A1 * | 5/2013 | Kotil | B32B 21/04 | 52/847 |
| 2013/0136886 A1 | 5/2013 | Dagesse | | |
| 2013/0199120 A1 * | 8/2013 | Bergelin | E04B 5/00 | 52/588.1 |
| 2013/0263554 A1 * | 10/2013 | Verhaeghe | E04H 1/125 | 52/775 |
| 2013/0316127 A1 * | 11/2013 | Yako | B27D 1/06 | 428/106 |
| 2014/0352232 A1 * | 12/2014 | Malakauskas | E04H 1/005 | 52/79.9 |
| 2015/0050443 A1 * | 2/2015 | Roy | E04C 2/12 | 428/58 |
| 2016/0258115 A1 * | 9/2016 | Penland, Jr. | E01C 9/086 | |
| 2017/0037582 A1 * | 2/2017 | Penland, Jr. | E01C 5/14 | |
| 2017/0138044 A1 * | 5/2017 | Malakauskas | E04C 2/10 | |
| 2018/0305873 A1 * | 10/2018 | Penland, Jr. | B32B 15/18 | |
| 2019/0168410 A1 * | 6/2019 | Conboy | B27N 1/00 | |
| 2019/0275698 A1 * | 9/2019 | Hirmke | B32B 5/022 | |
| 2020/0016873 A1 * | 1/2020 | Mueller | B32B 3/20 | |
| 2020/0299962 A1 * | 9/2020 | Espinosa | B32B 21/02 | |

FOREIGN PATENT DOCUMENTS

| | | | | |
|---|---|---|---|---|
| CA | 2872041 | | 11/2012 | |
| CN | 200963853 Y | * | 10/2007 | |
| CN | 101294653 A | * | 10/2008 | |
| CN | 202021653 U | * | 11/2011 | E04C 2/12 |
| CN | 102463607 A | * | 5/2012 | |

(56) References Cited

FOREIGN PATENT DOCUMENTS

| | | | | |
|---|---|---|---|---|
| CN | 102689338 A | * | 9/2012 | |
| CN | 203045913 U | * | 7/2013 | |
| CN | 203266833 U | * | 11/2013 | |
| CN | 103963373 A | * | 8/2014 | ........... B26D 7/2614 |
| CN | 105544757 A | * | 5/2016 | ............... B32B 7/02 |
| CN | 105569241 A | * | 5/2016 | |
| CN | 105926830 A | * | 9/2016 | |
| CN | 108162519 A | * | 6/2018 | |
| CN | 108162519 A | | 6/2018 | |
| DE | 487980 C | * | 12/1929 | ............. E04B 2/702 |
| DE | 655599 C | * | 1/1938 | ............... E04C 2/12 |
| DE | 1035880 B | * | 8/1958 | ............. E04B 2/821 |
| DE | 2148585 A1 | * | 4/1972 | ............. E04C 2/386 |
| DE | 2432273 A1 | * | 1/1976 | .......... E04F 13/0869 |
| DE | 3832498 A1 | * | 4/1990 | ............. E04C 1/397 |
| DE | 3916331 A1 | * | 10/1990 | ............. B32B 27/06 |
| DE | 29622260 U1 | * | 2/1997 | ............... E04C 2/12 |
| DE | 19852106 A1 | * | 5/2000 | ............... E04B 2/70 |
| DE | 20208773 U1 | * | 9/2002 | ............ B27M 3/004 |
| DE | 20316376 U1 | * | 2/2004 | ............... E04B 5/02 |
| DE | 202004010276 U1 | * | 9/2004 | ............. B32B 21/13 |
| DE | 202005011602 U1 | * | 10/2005 | ............. E04C 2/386 |
| DE | 202011106315 U1 | * | 12/2011 | ............. E04C 2/525 |
| DE | 202013001756 U1 | * | 3/2013 | ............... E04C 2/40 |
| DE | 2636809 A1 | | 9/2013 | |
| DE | 102013222605 A1 | * | 5/2015 | ............. E04F 15/045 |
| DE | 102014013420 A1 | * | 3/2016 | ............. B32B 21/14 |
| EP | 0069040 A2 | * | 1/1983 | ............... E04C 3/14 |
| EP | 0380057 A1 | * | 8/1990 | ............. E04C 3/122 |
| EP | 0560013 A1 | * | 9/1993 | ............... E04B 1/10 |
| EP | 0564675 A1 | * | 10/1993 | .......... B27M 3/0086 |
| EP | 0921249 A2 | * | 6/1999 | ............... E04C 2/12 |
| EP | 1288386 A1 | * | 3/2003 | ............... E04C 2/12 |
| EP | 1881124 A2 | * | 1/2008 | ............... E04C 2/12 |
| EP | 2806078 A1 | * | 11/2014 | ............... E04C 2/12 |
| ES | 1074942 U | * | 7/2011 | ............. B32B 5/028 |
| FR | 2240089 A1 | * | 3/1975 | ............... B27D 1/06 |
| FR | 2604655 A1 | * | 4/1988 | ............... E04C 2/52 |
| FR | 2913631 A1 | * | 9/2008 | ........... B26D 7/2614 |
| FR | 2922565 A1 | * | 4/2009 | ............... E04C 2/42 |
| GB | 123816 A | * | 3/1919 | ............... E04C 2/12 |
| GB | 157597 A | * | 1/1921 | ............... E04C 2/12 |
| GB | 2234935 A | * | 2/1991 | ............... E04C 2/24 |
| GB | 2292336 A | * | 2/1996 | ............... B27N 3/04 |
| GB | 2542199 A | | 3/2017 | |
| JP | 57022004 A | * | 2/1982 | |
| JP | 61175412 U | * | 11/1986 | |
| JP | 02001316 U | * | 1/1990 | ............. E04B 2/821 |
| JP | 06071608 A | * | 3/1994 | |
| JP | 06229069 A | * | 8/1994 | |
| JP | 3008469 U | * | 3/1995 | |
| JP | 09187806 A | * | 7/1997 | |
| JP | 10102612 A | * | 4/1998 | |
| JP | 11264556 A | * | 9/1999 | |
| JP | 11287016 A | * | 10/1999 | |
| JP | 2000013964 A | * | 1/2000 | ............... F16L 5/00 |
| JP | 2000141311 A | * | 5/2000 | |
| JP | 2001105408 A | * | 4/2001 | |
| JP | 2001150411 A | * | 6/2001 | |
| JP | 2001241140 A | * | 9/2001 | |
| JP | 2002156093 A | * | 5/2002 | |
| JP | 2003094410 A | * | 4/2003 | |
| JP | 2003291114 A | * | 10/2003 | |
| JP | 2003306994 A | * | 10/2003 | |
| JP | 2004222813 A | * | 8/2004 | |
| JP | 2004230621 A | * | 8/2004 | |
| JP | 2004276296 A | * | 10/2004 | ............... E04C 2/12 |
| JP | 2004345299 A | * | 12/2004 | |
| JP | 2007301885 A | * | 11/2007 | |
| JP | 2011101959 A | * | 5/2011 | |
| JP | 2016180293 A | * | 10/2016 | |
| JP | 2018145631 A | * | 9/2018 | |
| JP | 2019173275 A | * | 10/2019 | |
| KR | 20030009923 A | * | 2/2003 | ............. E04C 3/122 |
| RU | 143493 U1 | * | 7/2014 | ............... E04C 2/12 |
| WO | WO-9532082 A1 | * | 11/1995 | ............... E04C 3/14 |
| WO | WO-9800617 A2 | * | 1/1998 | ............. E04F 15/22 |
| WO | WO-0198044 A1 | * | 12/2001 | ............. B32B 21/13 |
| WO | WO-2008025312 A1 | * | 3/2008 | ............... E04C 2/12 |
| WO | WO-2010137934 A1 | * | 12/2010 | ............... B32B 7/02 |
| WO | WO-2011051794 A2 | * | 5/2011 | ............... E04C 2/12 |
| WO | WO-2012149634 A1 | * | 11/2012 | ............... E04C 2/12 |
| WO | WO-2013167848 A1 | * | 11/2013 | ............... E04B 1/86 |
| WO | WO-2013190498 A1 | * | 12/2013 | ............. B32B 5/028 |
| WO | WO-2014016752 A2 | * | 1/2014 | ............... E04C 2/14 |
| WO | WO-2014068039 A1 | * | 5/2014 | ........... G01R 31/367 |

OTHER PUBLICATIONS

Machine Translation of JP 2000013964 A, Jan. 2000 (Year: 2000).*
Machine Translation of JP-2002156093-A, May 2002 (Year: 2002).*
Machine Translation of JP-2004276296-A, Oct. 2004 (Year: 2004).*
Machine Translation of ES-1074942-U, Jul. 2011 (Year: 2011).*
Machine Translation of EP 2806078 A1, Nov. 2014 (Year: 2014).*
Machine Translation of DE 102014013420 A1, Mar. 2016 (Year: 2016).*
Machine Translation of CN 105926830 A, Sep. 2016 (Year: 2016).*
Machine Translation of CN 108162519 A, Jun. 2018 (Year: 2018).*
The PCT Search Report and Written Opinion dated Apr. 1, 2020, for PCT Application No. PCT/US2020/012217, 8 pages.

* cited by examiner

SECTION B-B

DETAIL C

CROSS-LAMINATED TIMBER HAVING A CONDUIT THEREIN

BACKGROUND

Mass timber is growing in popularity and interest due to the structural performance, aesthetics, and opportunity for innovation. Mass timber is strong, sustainable, and relatively cost-efficient. Cross-laminated timber (CLT) is one type of mass timber that is receiving growing attention in the construction industry. CLT is a solid wood panel made from several layers of lumber board, stacked and glued on their wide faces. Described herein are improvements and technological advances that, among other things, improve usability of CLT for construction.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the components on a larger scale or differently shaped for the sake of clarity.

DETAILED DESCRIPTION

Figure 1:
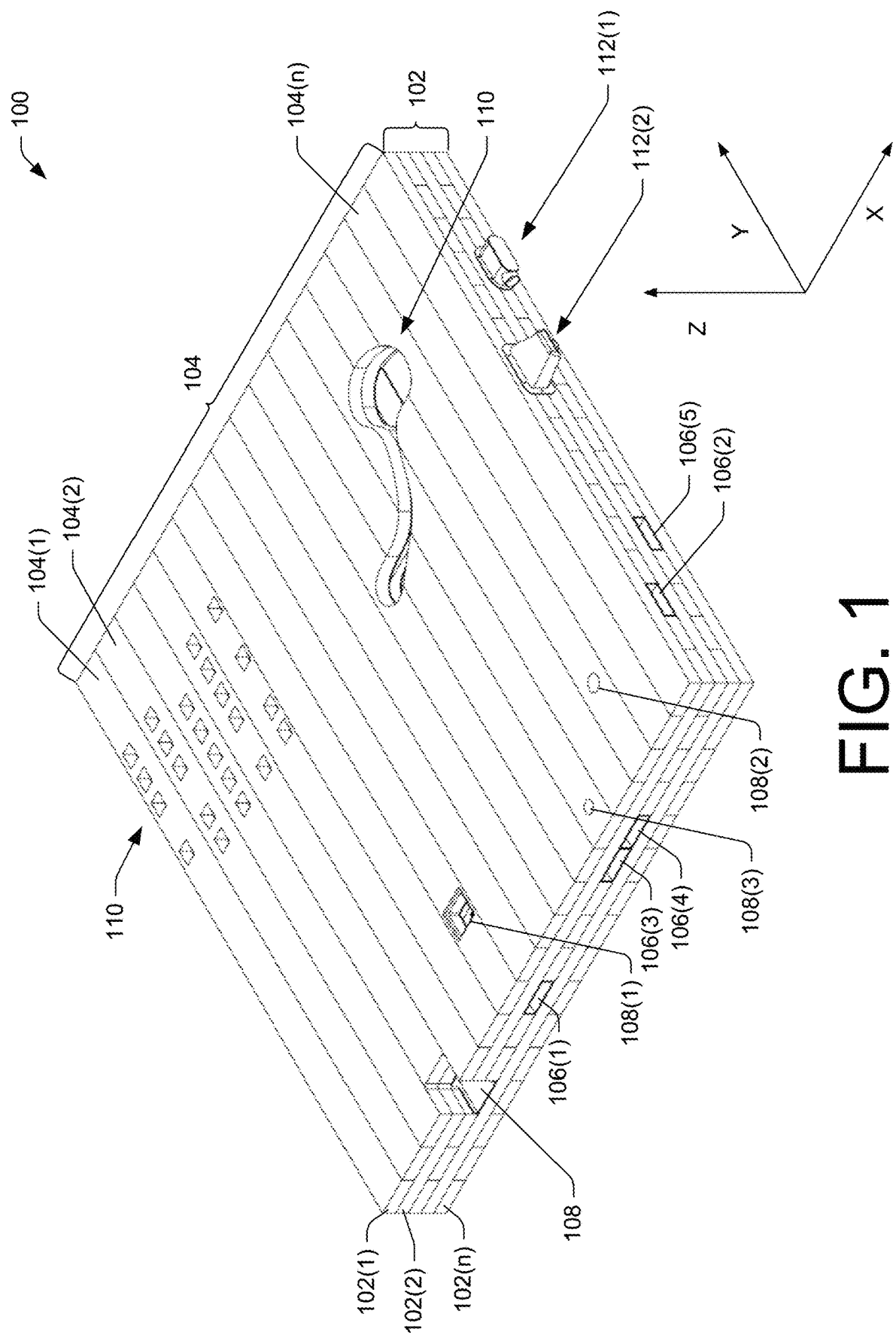
FIG. 1 illustrates a perspective view of an example cross-laminated timber panel.

As described previously, cross-laminated timber (CLT) panels may be implemented in a variety of different applications due to the strength, sustainability, and cost-efficiency that the CLT panels provide. CLT panels are diverse and may be implemented to construct an entire building, including both vertical and lateral load resisting systems, and/or CLT panels may be used for particular building elements such as walls, floors, or roofs. This disclosure is directed to a cross-laminated timber panel having a conduit therein. More specifically, this disclosure describes a CLT panel including a hollow member that is included as part of the CLT panel that may provide a conduit for cabling, air, plumbing, etc. CLT provides many advantages over other construction alternatives. For example, CLT panels may be manufactured offsite and CLT panels may utilize lower grade timber (which may be cheaper than higher grade timber), while increasing structural integrity.

However, traditional Light Wood Frame (LWF) construction provides easier means to route electrical cables and ducts transversely through the walls. This is due to the fact that CLT panels are comprised of solid material. Therefore, routing channels are often drilled through the CLT panel, cut into the surface of the CLT panel, or external exposed conduits may be utilized. However, this adds additional expense and labor in the field. Furthermore, transverse cuts in an outer layer of a CLT panel may greatly reduce the strength and bending resistance of the panel. Other solutions may include leaving out one or more members of the CLT panel during manufacture, thus leaving a void as a conduit. However, this too is problematic for modern manufacturing methods that implement hydraulic or mechanical clamping and pressing.

In examples, the CLT panel may include multiple layers of boards stacked crosswise and glued together on their wide faces. For example, a first layer of the CLT panel may include multiple boards, each oriented in a first direction. That is to say, a length of each board may extend in the first direction. The CLT panel may include a second layer that is adjacent to the first layer. The second layer may also include boards, each oriented in a second direction. In these examples, the second direction may be different than the first direction and, in examples, the second direction may be substantially perpendicular to the first direction. The CLT panel may include further layers, such that each additional layer may alternate directions between the first direction and the second direction. In other examples, one or more of the layers may be disposed in the same direction to each other and may not alternate directions. It should be understood that while the boards are described herein as being glued together on their wide faces, the boards may additionally, or alternatively, be glued on their narrow faces and/or on more of more edges of the individual boards.

Furthermore, the CLT panel may include adhesive that may be applied between each layer of the CLT panel. As mentioned previously, the boards may be adhered to one another on their wide faces. The CLT panel may also include one or more hollow members in at least one of the layers. In examples, the hollow members may take the place of boards in at least one of the layers of the CLT panel. The hollow members may provide a conduit through which cables, wiring, air, plumbing, etc. may pass.

Additional details of these and other examples are described below with reference to the drawings.

FIG. 1 depicts a perspective view of a cross-laminated timber (CLT) panel 100, according to an embodiment. As mentioned previously, the CLT panel 100 may include multiple layers 102 of boards 104 stacked crosswise and glued together on their wide faces. For example, the CLT panel 100 depicted in FIG. 1 includes five layers 102, each layer (102(1), 102(2), . . . 102(n)) including multiple boards 104. While FIG. 1 depicts the CLT panel 100 as having five layers, it is to be understood that the CLT panel 100 may include any number of layers 102. For example, the CLT panel may include 2, 3, 4, 5, 7, 9, etc. layers. Additionally, and/or alternatively, each layer (102(1), 102(2), . . . 102(n)) of the multiple layers 102 may include any number of boards 104. As shown in FIG. 1, the multiple boards 104 included in a single layer are all oriented in a same direction. For example, a first layer 102(1) may include first boards oriented such that a length of each board (104(1), 104(2), . . . 104(n)) extends in a first direction (that is the Y direction). In examples, the multiple boards 104 may include any type of wood material. While this description refers to the panel as a CLT panel it is to be understood that, in examples, the multiple boards 104 may include polymers, metals, composites, etc.

As described previously, the CLT panel 100 may include a second layer 102(2) of multiple boards 104 (or "second boards"). As shown in FIG. 1, the second layer 102(2) may be immediately adjacent to the first layer 102(1). In examples, the second layer 102(2) may include second boards oriented such that a length of each board of the second boards extends in a second direction. In such an example, the second direction may be different than the first direction. In the example shown in FIG. 1, the second layer 102(2) may include second boards that are oriented in a second direction that is substantially perpendicular relative to the first boards in the first layer 102(1) oriented din the first direction. In examples the term "substantially perpendicular" may include the first direction is at a 90-degree angle relative to the second direction, the first direction is at an angle between about 85 degrees and about 95 degrees relative to the second direction, or the first direction is at an angle between about 80 and about 100 degrees relative to the second direction. Still further, in examples, a CLT panel may include layers oriented at any angle relative to one another. Additionally, and/or alternatively, the CLT panel 100 may include adjacent layers having multiple boards oriented in a same or similar direction. As shown in FIG. 1, the CLT panel 100 may include multiple layers oriented such that each adjacent layer alternates between the first direction and the second direction. In examples, two or more of the layers may be oriented such that each adjacent layer does not alternate directions but instead is oriented in the same direction.

In examples, the CLT panel 100 may include adhesive (not shown) that may be applied to the multiple boards 104 between the layers 102 of the CLT panel 100. Such an adhesive may include at least one of phenolic types (such as phenol-resorcinal formaldehyde (PRF)), emulsion polymer isocyanate (EPI), and/or one-component polyurethane (PUR), among others. As mentioned previously, the adhesive may be applied to a wide face of the multiple boards 104. For example, a single board of the multiple boards may include a thickness, a width, and a length and the adhesive may be applied to the width of the board. In some examples, the thickness may be a narrow face of the board; however, in other examples, the thickness may be equal to the width of the board.

Additionally, in examples, the CLT panel 100 may include one or more hollow members 106 (also referred to herein as "spacer boards") included in at least one of the layers 102. As shown in FIG. 1, the CLT panel 100 may include multiple hollow members 106 disposed in multiple layers 102. In examples, the one or more hollow members 106 may be sized and/or configured as a conduit in each of the layers 102 that the one or more hollow members 106 are disposed. For example, the one or more hollow members 106 may provide a conduit through which cables, wiring, air, plumbing, etc. may pass. In examples, the one or more hollow members 106 may eliminate the need for pipes, ducts, etc. For example, the one or more hollow members 106 may provide a conduit through which fluids and/or gases may pass. Additionally, the one or more hollow members 106 may eliminate and/or reduce the need to attach external conduits/ducts to the outside of the CLT panel 100. Furthermore, placing one or more hollow members 106 in at least one of the layers 102 may reduce and/or eliminate the need to rout and/or bore the panel to receive electrical conduit, plumbing pipes, and/or mechanical chases, thus reducing on site and/or post production labor. In examples, the one or more hollow members 106 may include coatings and/or materials on an exterior and/or interior that provide insulation, fire-resistance, anti-bacterial compounds, etc.

In examples, the one or more hollow members 106 may have substantially similar outside dimensions as the multiple boards 104. That is to say, the one or more hollow members 106 may include substantially similar lengths, widths, and/or heights as the multiple boards 104. In such examples, the one or more hollow members 106 may be constructed such that the one or more hollow members 106 are free from any external protrusions. Additionally, and/or alternatively, the one or more hollow members 106 may include larger or smaller outside dimensions relative to the multiple boards 104. In examples, the one or more hollow members 106 may include varying inside dimensions. However, in examples, the one or more hollow members 106 may include substantially similar inside dimensions to one another. For example, the one or more hollow members 106 may be constructed with specific inside dimensions to accommodate certain materials, cables, fluids, etc. In examples, the one or more hollow members 106 may have first outside dimensions and/or first inside dimensions when constructed as an electrical conduit and the one or more hollow members may have second outside dimensions and/or second inside dimensions when constructed as an air duct. In examples, the hollow member may have a wall thickness and/or may be made of a material sufficient to withstand a clamping force and/or a pressing force during manufacture of the device. The wall thickness may be, for example, between about 0.1 centimeters to about 2 centimeters. The one or more hollow members 106 may be constructed of metal, plastic, or carbon fiber, or any hybrid material thereof. In examples, the hollow member may be constructed with adequate rigidity and/or strength to resist forces subjected thereto as a result of clamping and pressing during manufacture of the CLT panel. In such an example, the strength properties of the hollow member may be designed based at least in part on a specific manufacturing process. Additionally, and/or alternatively, the one or more hollow members 106 may be constructed of any material having at least one of substantially similar elastic properties as wood, substantially similar strength properties as wood, and/or substantially similarity mechanical properties as wood. In examples, the one or more hollow members 106 may be constructed of specific materials for a specific application of the one or more hollow members 106. For example, the one or more hollow members may be constructed of a first material (e.g., a polymer) when constructed as an electrical conduit and/or the one or more hollow members may be constructed of a second material (e.g., a metal) when constructed as an air duct. Additionally, and/or alternatively, the one or more hollow members 106 may be constructed of a same and/or similar material in any and/or all applications.

The one or more hollow members 106 may be disposed substantially equidistant throughout at least one of the layers 102. This could be considered a default spacing. For example, a hollow member 106 may be placed after every third board in a layer 102(n). In such an example, the default spacing (or equidistance) between hollow members may benefit a contractor updating or remodeling a structure including CLT panels. Much like stud spacing, a contractor would be able to rely on the fact that a hollow member is placed at known intervals throughout a layer and/or layers in a CLT panel. However, the one or more hollow members 106 may be placed according to a desired design for the CLT panel 100. For example, a CLT panel may be designed to include hollow members based on a specific building design. In another example, a CLT panel may include two hollow members disposed adjacent to one another. Still further, a CLT panel may include hollow members that are randomly arranged throughout the CLT panel. Furthermore, the CLT panel may include a hole or an access point 108 where one hollow member intersects and/or overlaps another hollow member. For example, as shown in FIG. 1, the first layer 102(1) includes an access point 108 disposed at a location where a first hollow member 106(1) disposed in the third layer 102(3) overlaps a second hollow member 106(2) in the second layer 102(2). Such a hole 108 may allow a contractor to access the one or more hollow members 106 that may be one or more layers deep in the CLT panel 100. This may also allow a contractor to change routing from the X direction to the Y direction. Additionally, and/or alternatively, the CLT panel 100 may include an access point located anywhere in a layer to allow access to an underlying hollow member 106.

In examples, the CLT panel 100 may include venting port(s) 110. The venting ports 110 may act as an air register or grille to allow air to flow therethrough. In examples, the access points 108 and the venting ports 110 may be included as part of the manufacture process of the CLT panel 100 or the access points 108 and the venting ports 110 may be machined into the CLT panel 100 after production. Additionally, and/or alternatively, the CLT panel 100 may include one or more windows, doors, etc. disposed in the CLT panel that may also be included as part of the manufacture process of the CLT panel 100 or may be machined into the CLT panel 100 post-production.

Furthermore, the one or more hollow members 106 may include one or more fittings 112 attached thereto. For example, a given hollow member of the one or more hollow members 106 may include a first end, a second end, and a fitting 112 attached to at least one of the first end or the second end. In examples, the hollow member may include an electrical fitting 112(1) or a duct fitting 112(2). An electrical fitting 112(1) may be attached to the hollow member 106, or alternatively to CLT material (e.g., the boards of the CLT panel) adjacent to the hollow member 106, to rout one or more of cables, wires, etc. therethrough. A duct fitting 112(2) may be attached to the hollow member 106, or to the CLT material adjacent to the hollow member 106, to allow passage of air therethrough. The interface may be gasketed in order to seal the connection. Additionally, and/or alternatively, the one or more hollow members 106 may include other types of fittings for mechanical chases. In examples, an electrical fitting may be constructed of a material different than a duct fitting. For example, an electrical fitting may be constructed of a polymer, while a duct fitting may be constructed of a metal. Additionally, and/or alternatively, an electrical fitting may be constructed of a same and/or similar material as a duct fitting. It should be understood that the fittings 112 as described herein may span multiple proximate hollow members 106.

Additionally, in examples, the CLT panel 100 may include an intermediate layer (not shown). The intermediate layer may act as a type of barrier, structural support, insulation, etc. For example, the intermediate layer may include at least one of acoustic insulation, gypsum board, fire retardant, insecticide, thermal insulation, etc. In examples, the adhesive may be applied to the intermediate layer to adhere the intermediate layer to the layers 102. Additionally, and/or alternatively, the CLT panel may include one or more outside layers attached to the outer layer of the CLT panel. In examples, hollow members may be included in the intermediate layer in the same or a similar manner as the placement of hollow members as described elsewhere herein.

Figure 2A:
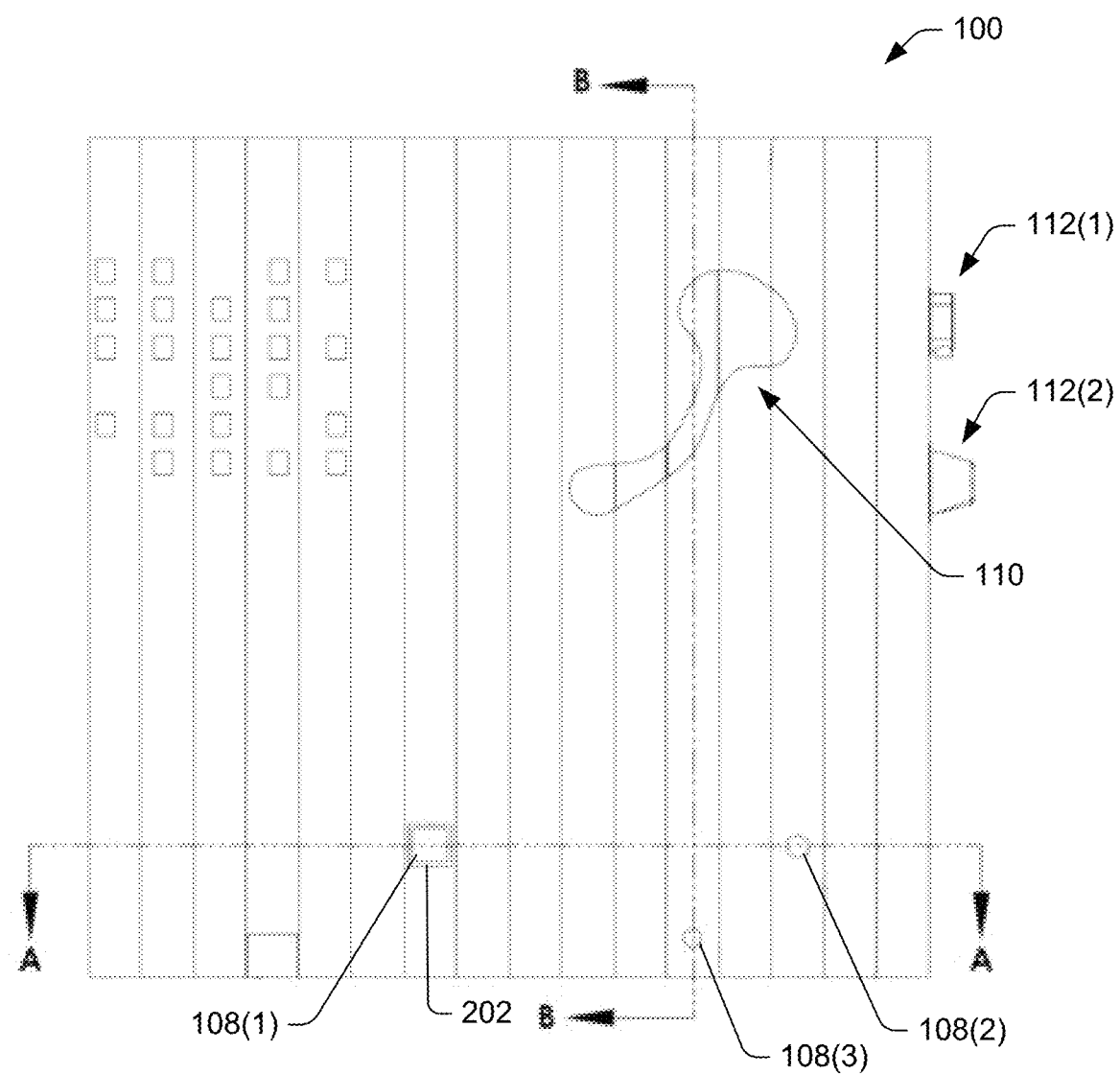
FIG. 2A illustrates a front view of an example cross-laminated timber panel.

FIG. 2A depicts a front view of the CLT panel 100. Depicted in FIG. 2A are cross section lines A-A and B-B. In examples, the CLT panel 100 in FIG. 2A may be oriented such that a bottom portion of the CLT panel 100 is positioned at the bottom of the Y axis and a top portion of the CLT panel 100 is positioned at the top of the Y axis. In such an example, the bottom portion of the CLT panel 100 may be connected to a floor of a structure and/or another CLT panel and the top portion may be connected to a ceiling of a structure and/or another CLT panel. In examples, the CLT panel 100 may be connected to other CLT panels in the X direction. Additionally, and/or alternatively, the CLT panel 100 may be connected to other mass timber structures (e.g., glue-laminated timber, nail-laminated timber, etc.), metal structures, wood structures, etc. The CLT panel 100 may be connected to other structures and/or panels via any fastening means or system. By way of example, the CLT panel 100 may be fastened to other structures and/or panels via at least one of glued-in rods, epoxied shear connectors, mechanical fasteners (e.g., nails, screws, glulam rivets, dowels, bolts, etc.), bearing-type fasteners (e.g., split rings, shear plates, etc.), etc. In examples, the CLT panel 100 may be fastened to other structures and/or panels via any fastener that comports with design specification in the region that the CLT panel may be used. For example, fasteners may be selected based on the approved fasteners set forth in the National Design Specification (NDS) for Wood Construction.

In examples, the CLT panel 100 may include a width that extends in the Y direction and a length that extends in the X direction. The width of the CLT panel may be up to about 8 feet or more wide and may be up to about 40 feet or more long. In some examples, the CLT panel 100 may be constructed to any specific dimensions greater than and/or less than the dimensions given above depending on placement in a structure.

Figure 2B:
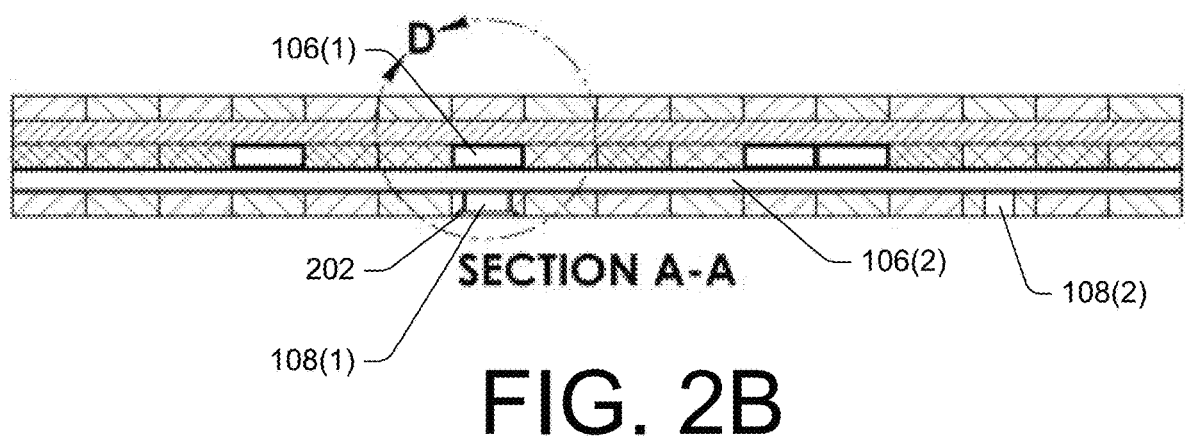
FIG. 2B illustrates a cross-sectional view of the cross-laminated timber panel taken along line A-A in FIG. 2A.
Figure 2C:
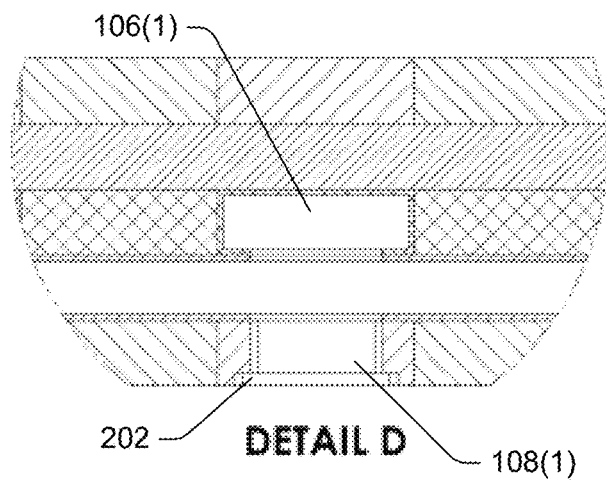
FIG. 2C illustrates a detail view (shown by circle D) of the cross-sectional view of the cross-laminated timber panel in FIG. 2B

FIG. 2B depicts a cross-sectional view of the CLT panel in FIG. 2A taken along line A-A. FIG. 2B depicts a first access point 108(1) as shown in FIG. 2A. The first access point 108(1) may include an electrical box 202 disposed within the first access point 108(1). This is depicted in greater detail in FIG. 2C. The first access point 108(1) may be disposed where the first hollow member 106(1) overlaps the second hollow member 106(2). FIG. 2B also depicts a second access point 108(2) disposed in the first layer of the CLT panel. FIG. 2B depicts additional hollow members that may be disposed throughout the CLT panel. In examples, each layer of the CLT panel may include a thickness. For example, a single layer of the CLT panel may be about 1 and ⅜ inches thick. However, in examples, a single layer of the CLT panel may include a thickness between about ⅝ inches to about 2 inches thick. The CLT panel may include layers having a thickness less than about ⅝ inches and/or greater than about 2 inches in some examples. Furthermore, the CLT panel may include a total thickness of up to about 20 inches thick. As mentioned previously, the CLT panel may include adjacent layers that are oriented in opposite directions and/or may include adjacent layers that are oriented in same directions. For example, the CLT panel may include a configuration of at least one of 3-ply 3-layer, 5-ply 5-layer, 6-ply 5-layer, 9-ply 9-layer, 5-ply 3-layer, 7-ply 5-layer, 8-ply 5-layer, 9-ply 7-layer, and/or any other configuration.

As mentioned previously, FIG. 2C depicts an electrical box 202 disposed within the first access point 108(1). The electrical box 202 may house one or more electrical components. For example, an electrical box included in the CLT panel may house at least one of an outlet, an electrical panel, electrical fixtures, etc. In examples, the electrical box 202 may be disposed in an outside layer of the CLT panel so as to provide access to the electrical box 202 once the CLT panel is installed.

Figure 2D:
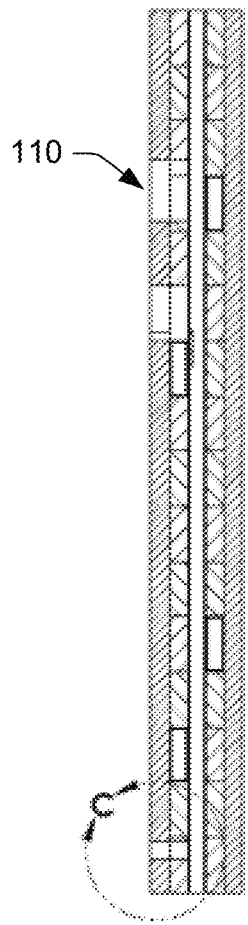
FIG. 2D illustrates a cross-sectional view of the cross-laminated timber panel taken along line B-B in FIG. 2A.

FIG. 2D depicts a cross-sectional view of the CLT panel in FIG. 2A taken along line B-B. FIG. 2D shows a vent portion 110 as shown in FIG. 2A. In examples, the vent portion 110 may be constructed for specific design purposes. For example, a vent portion 110 may be constructed in the CLT panel to receive a grille. However, in other examples, the vent portion 110 may be designed to act as the grille itself. Still further, in examples, the vent portion may be constructed to any specific size and/or shape. In examples, the vent portion 110 (or access points, ports, holes, etc.) may be formed during the manufacturing process and/or after the manufacturing process. As mentioned previously, each layer of the CLT panel may be about 1 and ⅜ inches thick. However, in examples, a single layer of the CLT panel may include a thickness between about ⅝ inches to about 2 inches thick. Furthermore, the CLT panel may include a total thickness of up to about 20 inches thick.

Figure 2E:
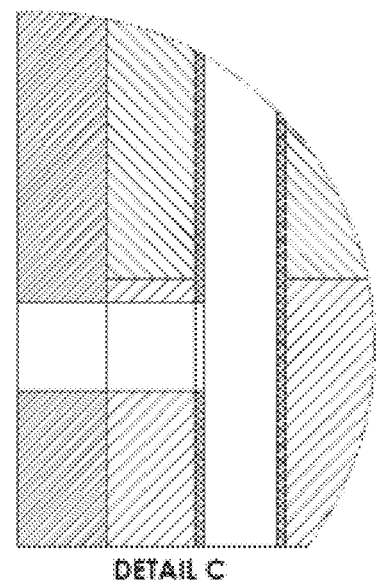
FIG. 2E illustrates a detail view (shown by circle C) of the cross-sectional view of the cross-laminated timber panel in FIG. 2C.

FIG. 2E depicts another example of an access point that is formed through multiple layers of the CLT panel to access a hollow member. In examples, access points disposed in the CLT panel may be constructed for specific design purposes. These access points may vary in shape and/or size. For example, a relatively small access point may be disposed in the CLT panel for mounting a light fixture thereto allowing passage of electrical wiring from the hollow member to the light fixture. However, in another example, a relatively large access point may be disposed in the CLT panel for mounting a television or other large features. In examples, access points, vent portions, etc. may be manufactured in the CLT panel by a computer numerical control (CNC) machine during or after production of the CLT panel. Additionally, and/or alternatively, access points, vent portions, etc. may be manufactured in the CLT panel by any other means (e.g., drilling by a human user, machine and/or human sawing, etc.)

Figure 3:
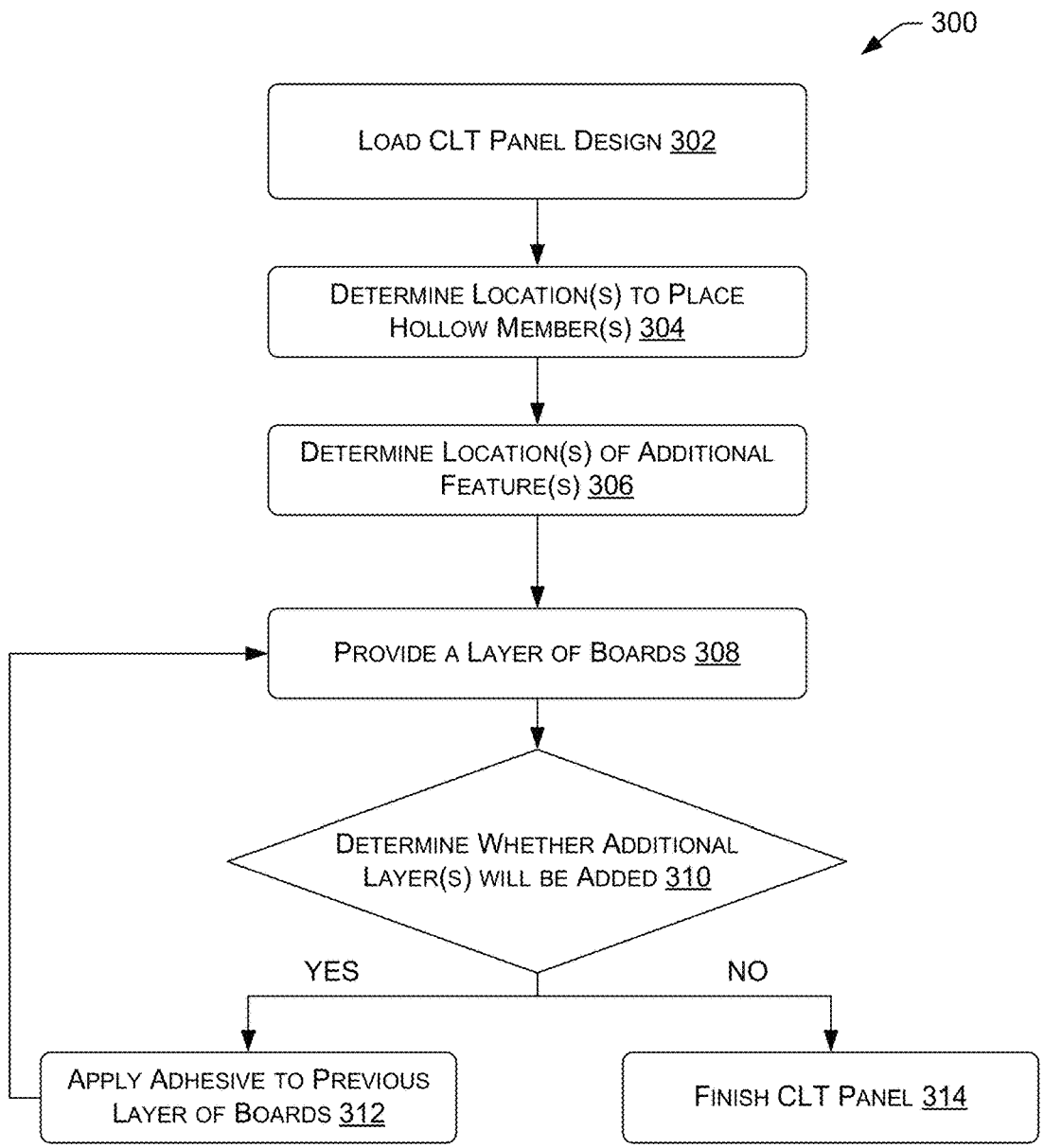
FIG. 3 is a flowchart illustrating an example process of manufacturing a cross-laminated timber panel.

FIG. 3 illustrates an example process 300 of manufacturing a cross-laminated timber (CLT) panel. For ease of explanation, the process 300 is described as being performed at least in part by a machine that is configured to complete the process 300 described herein. While this figure describes the machine performing/controlling this process, in examples, any one and/or all of the steps in the process may be completed by at least one human user.

The example manufacture process 300 (as well as each process described herein) is illustrated as a logical flow graph, each operation of which represents a sequence of operations that can be implemented by hardware, software, human users, or a combination thereof. In the context of software, the operations represent computer-executable instruction stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROM), random access memories (RAM), EPROMS, EEPROMS, flash memory, magnetic or optical cards, solid-state memory devices, or other types of storage media suitable for storing electronic instructions. In addition, in examples the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 302, an apparatus may load (or determine) a cross-laminated timber (CLT) panel design. For example, the apparatus may load CLT panel blueprint data. The blueprint (or design) may include information regarding the dimensions of the CLT panel and individual layers therein, locations and dimensions of hollow member(s) to be included in the CLT panel, locations and dimensions of other features (e.g., access points, electrical boxes, windows, etc.), types of materials to be used for certain portions of the CLT panel (e.g., individual boards in each layer, hollow members, electrical boxes, etc.), among other information.

At 304, the apparatus may determine, based at least in part on the CLT panel design data, a location or multiple locations to place one or more hollow members in the CLT panel. During step 304 of the process, the apparatus may determine where to place one or more hollow members in each layer of the CLT panel. As mentioned previously, this may include determining whether to place hollow members equidistant from one another throughout a layer and/or the CLT panel, whether to place hollow members randomly throughout the layer and/or the CLT panel, etc. Furthermore, at 304, the apparatus may also determine the type of material to use for each hollow member that may be included in the CLT panel. Such a determination may be based at least in part on the intended use of each hollow member in the CLT panel. For example, if a first hollow member is to be used as an air duct in the CLT panel, the apparatus may select a metallic hollow member, while if a second hollow member is to be used as an electrical conduit the apparatus may select a polymer hollow member. However, in examples, the apparatus may select hollow members constructed of other materials (e.g., polymer, organic material, composite, metal, etc.). Additionally, and/or alternatively, the apparatus may select hollow members including a same and/or similar material to use throughout the CLT panel.

At 306, the apparatus may determine, based at least in part on the CLT panel design data, a location or multiple locations of additional features to place throughout the CLT panel. Such additional features may include (but are not limited to) at least one of access points, recesses for electrical boxes, electrical boxes, holes, vents, grilles, recesses for covers and grills, doors, windows, etc. In examples, at least a portion of the features included in the CLT panel may be milled, cut, drilled, etc. after the CLT panel has been manufactured. In such examples, these processes may be included during a finishing step (described further herein below).

At 308, the apparatus may provide a layer of boards (including one or more hollow members). In examples, the apparatus may select and provide boards and/or hollow members individually until a complete layer is provided. However, in examples, a complete layer may be laid up prior to the manufacturing process 300 such that the apparatus may transfer a complete layer from a waiting position to a lay-up position. In such examples, human users may lay out multiple boards and/or hollow members to construct a complete layer. In either example, the one or more hollow members may be laid out according to their determined positions from step 304. In examples, the multiple boards and/or hollow members may be primed prior to being provided at step 308. Such priming may include, but is not limited to, sanding, washing, finger jointing, drying, removing defects, etc. In examples, the CLT panel may be constructed of lower grade timber compared to typical hollow wall light-weight frame construction. For example, the CLT panel may be constructed of timber that is lower grade and/or different dimension when compared to typical 2×4's, 2×6's, etc. The increased strength and redundancy of a CLT panel allows the construction to be of lower grade and/or smaller dimension lumber, which, in turn, may reduce the overall cost of constructing a structure.

At 310, the apparatus may determine, based at least in part on the design data, whether an additional layer is to be added.

If it is determined at 310 that additional layers are to be added to the CLT panel, at 312 the apparatus may apply adhesive to the previous layer. As mentioned previously, the adhesive may be applied to the wide face of the boards and/or hollow members included in the previous layer. Such an adhesive may include, but is not limited to, at least one of phenolic types (such as phenol-resorcinal formaldehyde (PRF)), emulsion polymer isocyanate (EPI), and/or one-component polyurethane (PUR), among others.

After the adhesive is applied at 312, the process may repeat steps 308 and 310 until an entire CLT panel is completed. The apparatus may repeat steps 308-312 as many times as necessary. As mentioned previously, the CLT panel may be constructed of two or more layers. In examples, the CLT panel may be constructed of an odd number of layers (i.e., 3 layers, 5 layers, 7 layers, etc.). However, in examples, the CLT panel may be constructed of any number of layers. Such layers may include additional boards and/or hollow members. Additionally, and/or alternatively, additional layers may include intermediate layers described above with respect to FIG. 1.

At step 310, if it is determined that no additional layers are to be added to the CLT panel, the apparatus may finish the CLT panel at step 314. The finishing step 314 may include at least one of cutting, sanding, pressing, clamping, drilling, milling, sawing, inspecting, testing, etc. It is at step 314, that features may be added that may not be include during the manufacture process steps 302-312.

While various examples and embodiments are described individually herein, the examples and embodiments may be combined, rearranged and modified to arrive at other variations within the scope of this disclosure.

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter. Each claim of this document constitutes a separate embodiment, and embodiments that combine different claims and/or different embodiments are within the scope of the disclosure and will be apparent to those of ordinary skill in the art after reviewing this disclosure.

What is claimed is:

1. A cross-laminated panel comprising:
a first layer including first solid boards, the first boards oriented in a first direction, the first boards having a square or rectangular transverse cross-section;
a first adhesive between the first layer and a second layer, the second layer including second solid boards and one or more hollow members, the second boards and the one or more hollow members oriented in a second direction at an angle to the first direction in plan view, the second boards and the one or more hollow members comprising substantially similar exterior dimensions as each other and comprising a square or rectangular transverse cross-section; and
a second adhesive between the second layer and a third layer,
the third layer including third solid boards and one or more hollow members, the third boards and the one or more hollow members oriented in the first direction, the third boards and the one or more hollow members comprising substantially similar exterior dimensions as each other and comprising a square or rectangular transverse cross-section, wherein the second layer is disposed between the first layer and the third layer,
wherein each of the one or more hollow members comprises a wall forming a closed hollow transverse cross-section, wherein the wall of at least one of the one or more hollow members of the second layer and the wall of at least the one or more hollow members of the third layer are in communication forming one or more predetermined routing paths in the first and second directions.

2. The cross-laminated panel according to claim 1, wherein the one or more predetermined routing paths form conduits for the electrical wiring, fiber optic cables, plumbing, and/or air flow.

3. The cross-laminated panel according to claim 1, wherein the first direction and the second direction are perpendicular or orthogonal to each other.

4. The cross-laminated panel according to claim 1, wherein the first boards of the first layer, the second boards and one or more hollow members of the second layer, and the third boards and one or more hollow members of the third layer each comprises the same exterior dimensions and the same outer peripheral dimensions of the square or rectangular transverse cross-section.

5. The cross-laminated panel according to claim 1, wherein the wall of at least one of the one or more hollow members of the second layer and the wall of at least the one or more hollow members of the third layer each comprises at least one hole at a point of intersection forming the one or more predetermined routing paths in the first and second directions.

6. The cross-laminated panel according to claim 1, further comprising additional hollow members disposed throughout at least one of the first layer, the second layer, or the third layer at a default spacing from each other which may or may not include the one or more predetermined routing paths.

7. The cross-laminated panel according to claim 1, further comprising one or more additional layers, each additional layer including boards and one or more hollow members comprising same exterior dimensions as the boards;
each successive additional layer having boards and one or more hollow members alternating in orientation between the first direction and the second direction; and
one of more holes between one of more of the hollow members of each successive layer, the one or more holes defining the one or more predetermined routing paths in two dimensions or in three dimensions for the wires and/or for the air ducts.

8. The cross-laminated panel according to claim 1, wherein the cross-laminated panel is formed as a cross-laminated timber (CLT) panel, wherein each of the first, second, and third solid members is formed from wood and each of the hollow members is formed from a material comprising at least one selected from the group of wood, carbon fiber, polymer/plastic, metal, or any hybrid thereof.

9. The cross-laminated panel according to claim 8, wherein the material of each of the hollow members comprises at least one of substantially similar elastic properties as wood, substantially similar strength properties as wood, and/or substantially similarity mechanical properties as wood, such that each of the hollow members comprises adequate rigidity and/or strength to resist forces subjected thereto as a result of clamping and pressing during manufacture of the CLT panel.

10. The cross-laminated panel according to claim 8, wherein each of the walls of the one or more hollow members comprises a wall thickness between about 0.1 centimeters to about 2.0 centimeters.

11. The cross-laminated panel according to claim 2, wherein one or more of the hollow members include a first end and an opposing second end at a periphery of the cross-laminated panel, and further comprising a fitting attached to the first end or the second end, wherein the fitting comprises at least one of an electrical fitting or a duct fitting.

12. The cross-laminated panel according to claim 2, wherein one or more solid boards of the first layer comprises an access point extending to one of more of the hollow members of the second layer and/or the third layer allowing access thereto.

13. The cross-laminated panel according to claim 12, wherein the access point extends to the point of intersection between the at least one second hollow member and at least one third hollow member allowing access to the one or more predetermined routing paths.

14. The cross-laminated panel according to claim 12, wherein the access point comprises an electrical box disposed therein, wherein the electrical box houses at least one of an outlet, electrical panel, or electrical fixtures.

15. The cross-laminated panel according to claim 2, wherein one or more solid boards of the first layer comprises a venting port acting as an air resister or grille allowing air to flow therethrough.

16. The cross-laminated panel according to claim 1, wherein the panel comprises one or more openings for windows or doors disposed therein.

17. The cross-laminated panel according to claim 1, wherein each of the first layer, second layer, third layer, and optionally additional layers comprising solid boards oriented in a first or second direction, comprise a layer thickness of about % to about 2 inches, wherein a total thickness of the cross-laminated panel up to about 20 inches.

18. The cross-laminated panel according to claim 1, wherein a total number of layers of the cross-laminated panel is three to nine layers.

19. The cross-laminated panel according to claim 1, wherein the first and second adhesive comprise at least one of a phenolic type, emulsion polymer isocyanate (EPI), and/or one-component polyurethane.

20. The cross-laminated panel according to claim 1, further comprising an intermediate layer within the panel comprising at least one of acoustic insulation, gypsum board, fire retardant, insecticide, thermal insulation.

* * * * *